United States Patent [19]

Schlagel

[11] Patent Number: 5,474,135
[45] Date of Patent: Dec. 12, 1995

[54] MINIMUM TILLAGE IMPLEMENT

[75] Inventor: Ronald L. Schlagel, Torrington, Wyo.

[73] Assignee: Schlagel Manufacturing, Inc., Torrington, Wyo.

[21] Appl. No.: 199,723

[22] Filed: Feb. 22, 1994

[51] Int. Cl.⁶ .............................. A01B 5/04; A01B 49/02
[52] U.S. Cl. ...................... 172/151; 172/134; 172/146; 172/149; 172/152; 172/175; 172/177; 172/180; 172/182; 172/196; 172/688
[58] Field of Search .................................. 172/134, 145, 172/146, 148, 149, 151, 152, 153, 174–177, 180, 182, 196, 699, 701, 688, 686, 694

[56] References Cited

U.S. PATENT DOCUMENTS

| 2,730,030 | 1/1956 | Chambers ............................... 172/688 |
| 3,042,118 | 7/1962 | Norris . |
| 3,135,339 | 6/1964 | Fry et al. .............................. 172/688 |
| 3,314,386 | 4/1967 | Kopuska ............................... 172/688 |
| 3,362,120 | 9/1972 | Cline ..................................... 172/151 |
| 3,680,648 | 8/1972 | Tonsfeldt . |
| 3,998,275 | 12/1976 | Eisenhardt . |
| 4,083,411 | 4/1978 | van der Lely . |
| 4,114,695 | 9/1978 | van der Lely . |
| 4,117,889 | 10/1978 | Larson . |
| 4,180,005 | 12/1979 | Zumbahlen ............................ 172/146 |
| 4,187,916 | 2/1980 | Harden . |
| 4,250,970 | 2/1981 | Pfenninger . |
| 4,520,877 | 6/1985 | Magelky ............................... 172/688 |
| 4,524,837 | 6/1985 | Harden . |
| 4,601,248 | 7/1986 | Beasley . |
| 4,729,435 | 3/1988 | Urich . |
| 4,762,181 | 8/1988 | Cox . |
| 4,865,132 | 9/1989 | Moore . |

FOREIGN PATENT DOCUMENTS

| 2461 | 6/1926 | Australia ............................... 172/149 |
| 280048 | 8/1988 | European Pat. Off. ............... 172/145 |
| 453852 | 10/1991 | European Pat. Off. ............... 172/151 |
| 2043416 | 10/1980 | United Kingdom ................... 172/149 |

OTHER PUBLICATIONS

Bushhog Ro–Till, brochure, undated.
Bushhog Ro–Till Operator's Manual, undated.
KMC brochure, date stamped Oct. 3, 1989.

Primary Examiner—Terry Lee Melius
Assistant Examiner—Spencer K. Warnick, IV
Attorney, Agent, or Firm—Dean P. Edmundson

[57] ABSTRACT

A tillage implement for preparing seed beds for planting seeds for row crops. The implement includes deep tillage units for loosening soil behind the wheels of a tractor, additional deep tillage units for loosening soil in the areas where seed beds are located, seed bed shaping units, and ribbed wheels for providing guide tracks in the soil for use in aligning a planter with the seed beds.

8 Claims, 3 Drawing Sheets

MINIMUM TILLAGE IMPLEMENT

FIELD OF THE INVENTION

This invention relates to tillage implements. More particularly, this invention relates to implements which include components for performing a plurality of tillage functions. Even more particularly, this invention relates to minimum tillage implements for preparing seed beds for planting row crops.

BACKGROUND OF THE INVENTION

Previously available seed bed preparation implements exhibit a number of disadvantages and limitations. For example, some prior implements which included sub-soiler shanks cause the soil to "boil" up and outwardly to such a great extent that a large void is left in the soil behind the shanks. In order to fill the void it is necessary to move excessive amounts of dry top soil to the void where the dry soil is mixed with wet soil. This results in lowering of the moisture content of the soil in the seed bed, thereby hampering germination of seeds which are planted in the seed bed.

Also, some prior implements tend to move from side-to-side when they are towed across a field. This is very undesirable because the seed beds are not straight, and in some areas the seed beds from one pass of the implement across the field are too close to the seed beds prepared with the next pass across the field.

The prior implements do not provide any means for conveniently and effectively aligning a planter with the prepared seed beds. This requires the operator of the planter to be particularly careful so that the seeds are planted in the proper place.

Prior implements also do not work well in heavier clay soils. This drawback can limit the utility of such implements.

There has not heretofore been provided a minimum tillage implement having the advantages exhibited by the implement of the present invention.

SUMMARY OF THE INVENTION

In accordance with the present invention there is provided a minimum tillage implement for preparing soil for planting row crops. The implement is intended to be towed behind a conventional farm tractor.

The implement includes, in a preferred embodiment, three tool bars. The first tool bar supports a plurality of deep penetration rotatable disks which are rigidly mounted so that they cannot move from side-to-side. They are aligned parallel to the path of travel of the implement, i.e., parallel to the longitudinal axis of the implement. Because these disks cannot pivot from side-to-side, they help maintain a straight line of travel for the implement, i.e., the disks do not permit the implement to waver as it is towed across a field.

The second tool bar has several deep tillage units attached. These deep tillage units are aligned behind the drive wheels of the tractor so that soil which is compacted by the drive wheels is dislodged and broken up (so as to eliminate compaction of the soil).

Another set of deep tillage units is carried by a third tool bar located rearwardly of the tool bar. This set of deep tillage units is for loosening the soil in the areas where the seeds are to be planted for the row crops. Generally, there is one deep tillage shank for each row of seeds to be planted.

Rearwardly of the second set of deep tillage units there are seed bed shaping means for each row to be planted. Preferably each seed bed shaping means comprises (a) opposing fluted coulters for pushing the loosened soil into a seed bed, and (b) a rolling basket for breaking soil clumps in the seed bed.

Between the seed bed areas there are two ribbed wheels for making depressions or guide tracks in the soil for aligning a planter with the prepared seed beds. The planter is typically towed by a tractor across the field in a separate operation. When the planter is so aligned with the prepared seed beds, the seeds are planted properly in the seed beds. It is also possible for the seed planter to be towed directly by the minimum tillage implement, if desired. As another alternative, it is possible to include seed planter boxes directly onto the minimum tillage implement so that with each pass across a field the soil is loosened and prepared for seeding, and the seeds are also planted.

The tillage implement of the invention also preferably includes marker means carried by the frame for making an appropriate mark in the soil along, and spaced outwardly from, one side of the implement. This mark enables the operator to maintain the proper position of the implement on the next pass across the field such that the proper spacing of seed beds is maintained on each pass of the implement across the field.

The tillage implement described herein is well suited for western arid farming regions where moisture retention by the soil is especially critical. Also, the implement of this invention is quite suitable for smaller tractors and for use in smaller fields where turn-around area is limited.

Other advantages of the implement of this invention will be apparent from the following detailed description and the accompanying drawings.

BRIEF DESCRIPTION OF THE DRAWINGS

This invention is described in more detail hereinafter with reference to the accompanying drawings wherein like reference characters refer to the same parts throughout the several views and in which.

DETAILED DESCRIPTION OF THE INVENTION

Figure 1:
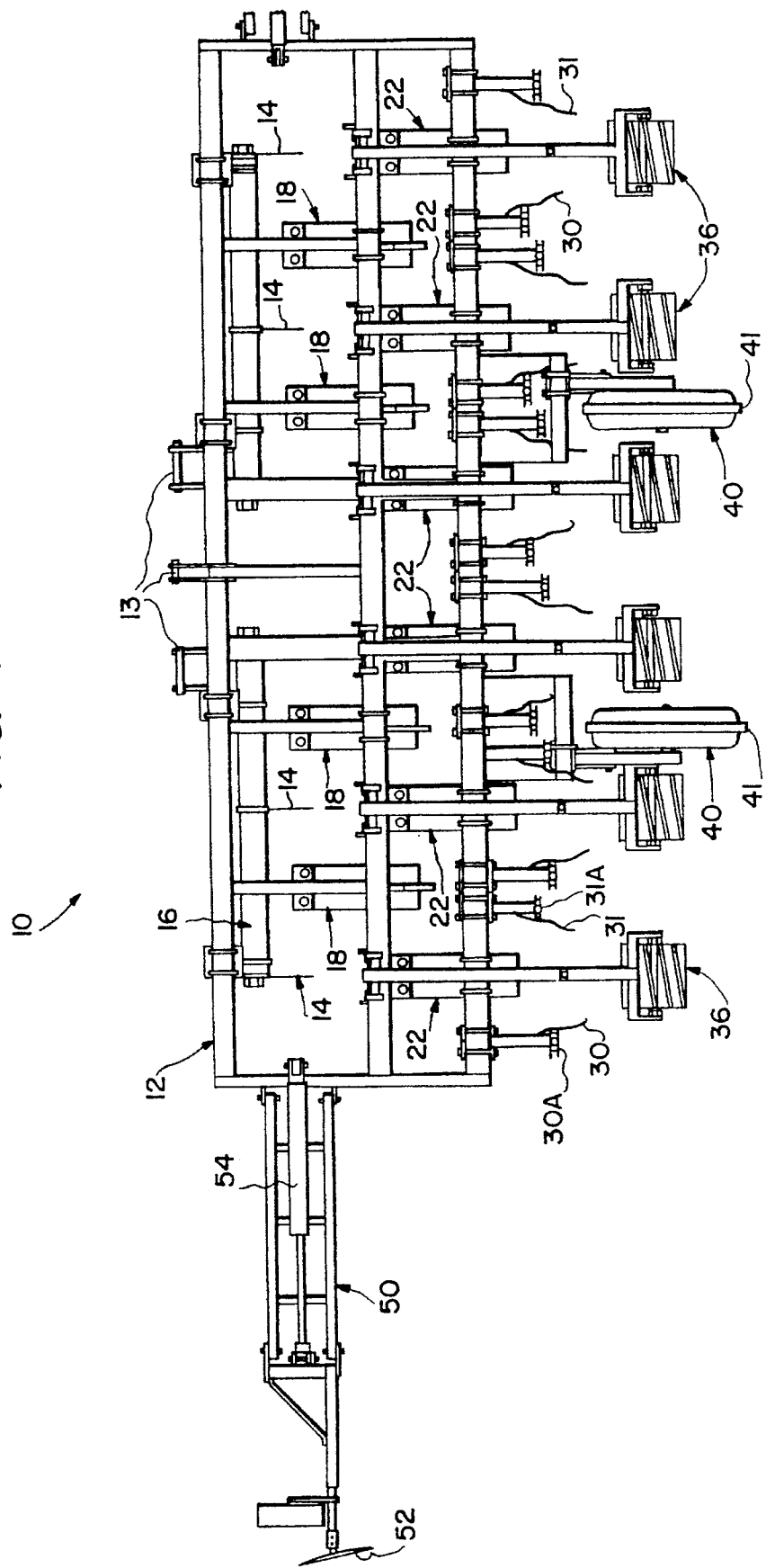
FIG. 1 is a top view of a minimum tillage implement in accordance with this invention.
Figure 2:
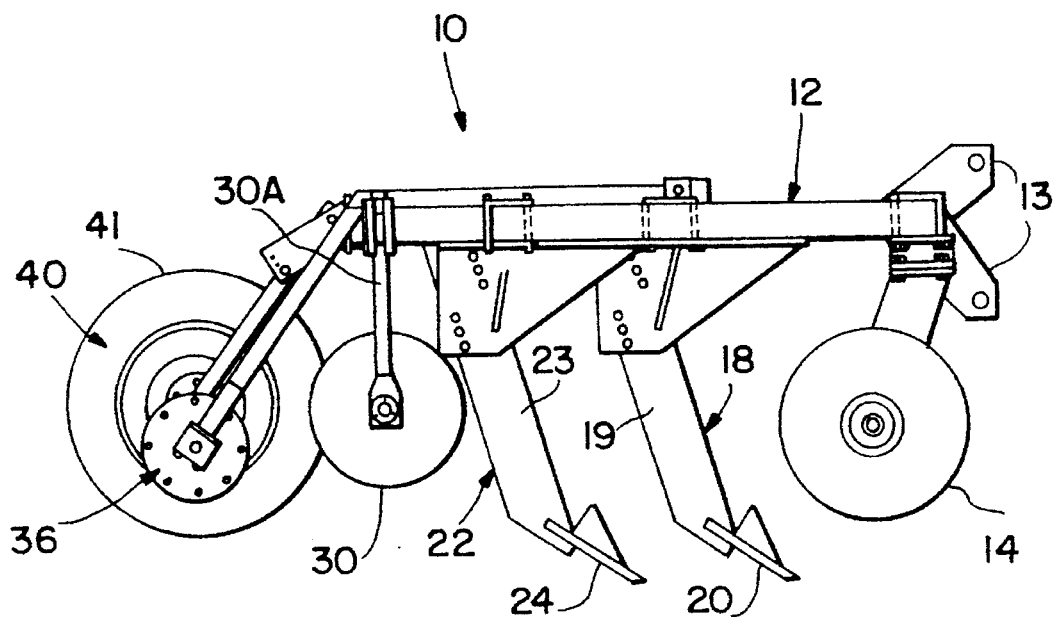
FIG. 2 is a side elevational view of the implement of FIG. 1.
Figure 3:
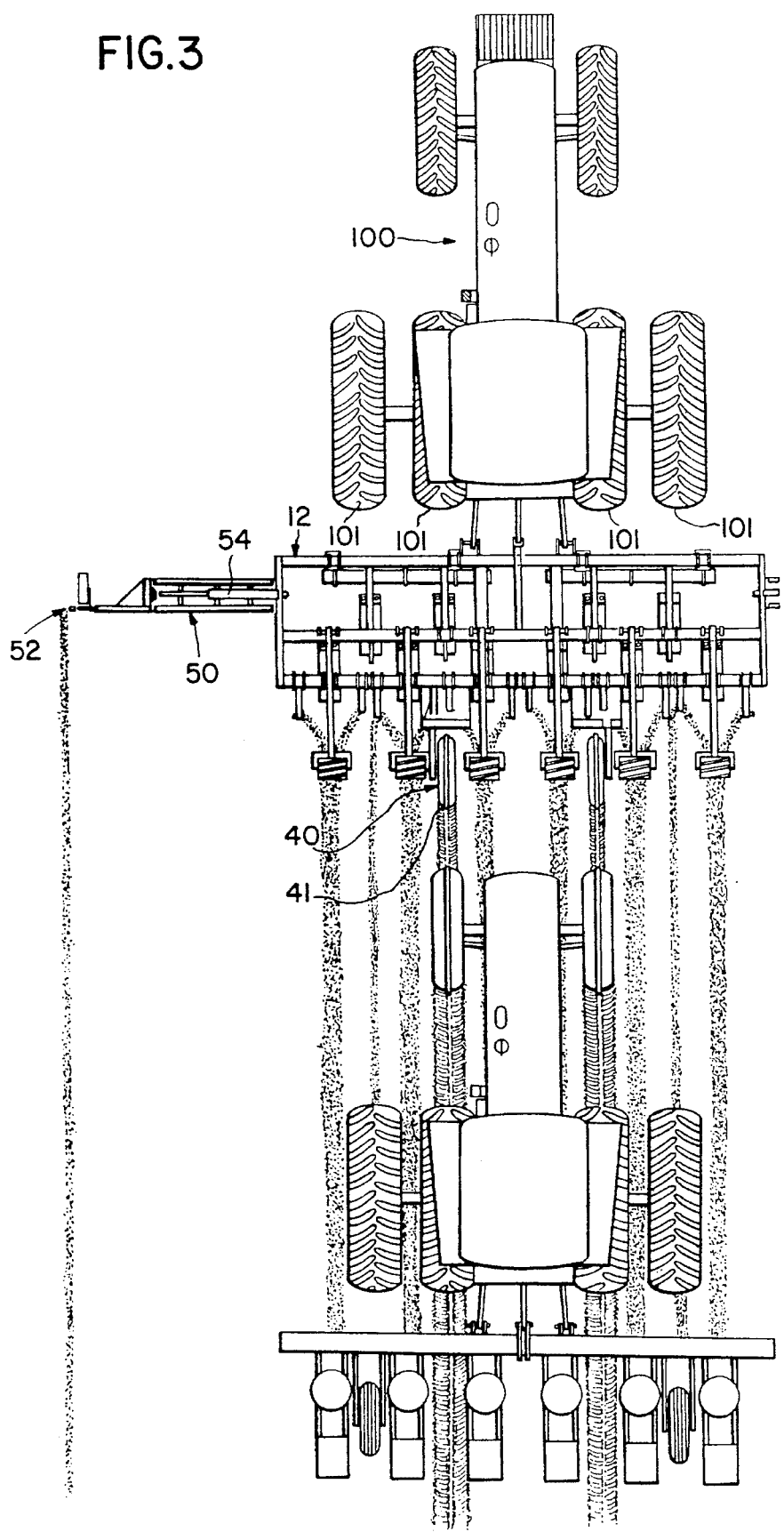
FIG. 3 is a top view showing the implement of FIG. 1 being towed across a field and followed by a planter which is properly aligned with the seed beds prepared by the tillage implement of the invention.

In the drawings there is shown a minimum tillage implement 10 of the invention which is intended to be drawn or towed across a field to prepare seed beds for the planting of seeds, typically for row crops such as corn, beans, sugar beets, etc. The tillage implement comprises a frame 12 which supports a plurality of tillage components. At the front end of the frame are attachment brackets 13 for connecting the implement to a three-point hitch on a tractor. Near the front or forward end of the implement there are several large diameter coulters 14 which are carried on a transverse rolling shaft 16. See FIG. 1. The coulters accordingly are able to rotate but are not able to move laterally (i.e., the coulters cannot pivot from side-to-side). These coulters are for the purpose of adding stability to the implement to prevent lateral movement or wavering of the implement as it pulled across a field. The coulters extend several inches into the soil, and the coulters are parallel to each other and parallel to the direction of travel of the implement. This is very advantageous because it results in the seed beds being straight in the field.

A plurality of spaced-apart deep tillage units 18 are carried by the frame. Each such deep tillage unit includes an elongated shank 19 with a shoe 20 on its lower end. Each deep tillage unit 18 is aligned with (i.e., directly behind) a drive wheel 101 of the tractor 100 so that the soil (which is compacted by each drive wheel) is loosened and broken up by a deep tillage unit.

The implement also includes a plurality of deep tillage units 22 which are carried by the frame 12. Each of the deep tillage units include an elongated shank 23 with a shoe 24 on its lower end. Each deep tillage unit 22 is positioned where it is desired to have a seed bed. Because there are several of the deep tillage units 22, the implement is able to prepare several spaced-apart parallel seed beds with each pass of the implement across the field. Typically there may be six or eight of the deep tillage units 22 in the implement. The spacing between tillage units 22 is determined by the desired spacing between rows.

Rearwardly of the tillage units 22 are seed bed shaping means comprising opposing fluted rotatable coulters 30 and 31 which are carried on the lower end of a shank 30A and 31A, respectively. These coulters are angled such that they push soil on each side of the seed bed toward the center area of the seed bed, and they also help to cut residue from previous crops. Following behind each set of fluted coulters is a rolling basket 36. The rolling basket breaks up clods and clumps of soil which may be laying on top of the seed bed area. The rolling basket also helps to firm up the seed bed slightly to conserve moisture in the seed bed.

The implement of the invention also includes two ribbed wheels 40 having a raised central rib 41. As the implement is towed across the field, the raised rib 41 of each wheel 40 makes a deep impression in the soil between two adjacent seed bed areas. These impressions serve as guides or tracks for a tractor towing a seed planter across the field. With this arrangement, the planter is assured to be properly aligned with the seed bed areas which have been prepared by implement 10. Thus, the seeds are assured to be planted in the prepared seed bed areas. The impressions left in the soil by ribs 41 provide guides for the front wheels of the tractor pulling the planter, and it is not necessary for the planting to be done immediately after the seed beds have been prepared. For example, if the soil is too wet at the time the seed beds are prepared, the planting can be done a few days later when soil conditions are more appropriate.

Preferably the tillage implement 10 includes a marker arm 50 extending outwardly from the frame on each side. The arm can be raised or lowered by means of hydraulic cylinder 54. The outer end of each arm includes a marker disk 52 for providing a marker line in the soil alongside the implement. With each pass of the implement across the field, one of the markers is in its lowered position and the other marker is in its raised position. The marker line in the soil provides a guide to be followed by the tractor towing the implement 10. This assures that when the implement makes each pass across a field, the seed bed areas prepared in each such pass will be parallel to, and properly spaced from, the seed bed areas prepared in a preceding pass across the field.

Other variants are possible without departing from the scope of this invention. For example, fertilizer, herbicide, and fumigant units can be carried by the implement so that any of those desired chemicals can be conveniently and efficiently applied to the soil. Also, planting units can be carried by the implement on a separate bar so that seeds can be planted in the seed beds as soon as the beds are prepared. The impressions left in the soil by the ribbed tires are then useful for guiding a tractor in a later operation, e.g., for cultivation.

It is also possible to use cone-shaped disks in place of the fluted coulters if higher soil ridges are desired. As another variation, a large elongated rolling cage or basket may be used in place of the small individual baskets illustrated herein. The large rolling cage may have a length generally as great as the width of the implement, if desired, and it is useful in breaking up dirt clods in high clay soils.

What is claimed is:

1. A tillage implement for towing across a field behind a tractor for preparing a plurality of spaced-apart, parallel seed beds for planting seeds for row crops, wherein said tractor includes a plurality of drive wheels and a three-point hitch; wherein said tillage implement comprises:

(a) frame means including attachment brackets for connecting said implement to said three-point hitch on said tractor;

(b) a first deep tillage unit carried by said frame means behind each said drive wheel of said tractor;

(c) a second deep tillage unit carried by said frame means and corresponding to each seed bed;

(d) seed bed shaping means behind each said second deep tillage unit;

(d) providing seed bed shaping means behind each said second deep tillage unit;

(e) ribbed wheels carried by said frame means rearwardly of said first deep tillage unit for providing guide tracks in the soil foruse in aligning a planter with said seed beds; wherein each said wheel includes a single raised rib; and (f) a plurality of cutting coulters on a transverse shaft forwardly of, and in alignment with, each said second deep tillage unit.

2. An implement in accordance with claim 1, wherein said seed bed shaping means comprises opposing coulter members and rolling baskets.

3. An implement in accordance with claim 1, further comprising marker means extending outwardly from said frame means for providing a guide mark in the soil alongside said implement.

4. An implement in accordance with claim 1, wherein there are four of said first deep tillage units.

5. An implement in accordance with claim 1, wherein there are at least six of said second deep tillage units.

6. A method for preparing seed beds in a field for planting seeds for row crops, the method comprising the steps of:

(a) providing an implement to be towed across said field by a tractor having drive wheels; further providing said implement with a three-point hitch for attaching said implement to said tractor; further providing said implement with a plurality of cutting coulters attached to a transverse shaft carried by said implement;

(b) providing a first deep tillage unit on said implement behind each said drive wheel;

(c) providing a second deep tillage unit on said implement corresponding to each said seed bed;

(d) providing seed bed shaping means behind each said second deep tillage unit;

(a) providing ribbed wheels on said implement rearwardly of said first deep tillage unit for providing guide tracks in the soil for use in aligning a planter with said seed beds; wherein each said wheel includes a single raised rib.

7. A method in accordance with claim 6, comprising the further step of providing marker means extending outwardly from said implement for providing a guide mark in the soil alongside said implement.

8. A method in accordance with claim 6, comprising the further step of towing a planter behind said implement, wherein said planter includes planting units in alignment with said seeds beds.

* * * * *